Oct. 20, 1936.  C. C. WORTHINGTON  2,058,048

GANG LAWN MOWER

Filed March 9, 1933  3 Sheets-Sheet 1

INVENTOR.
Charles C. Worthington
BY
Jeffrey Kimbach & Eggleston
ATTORNEYS.

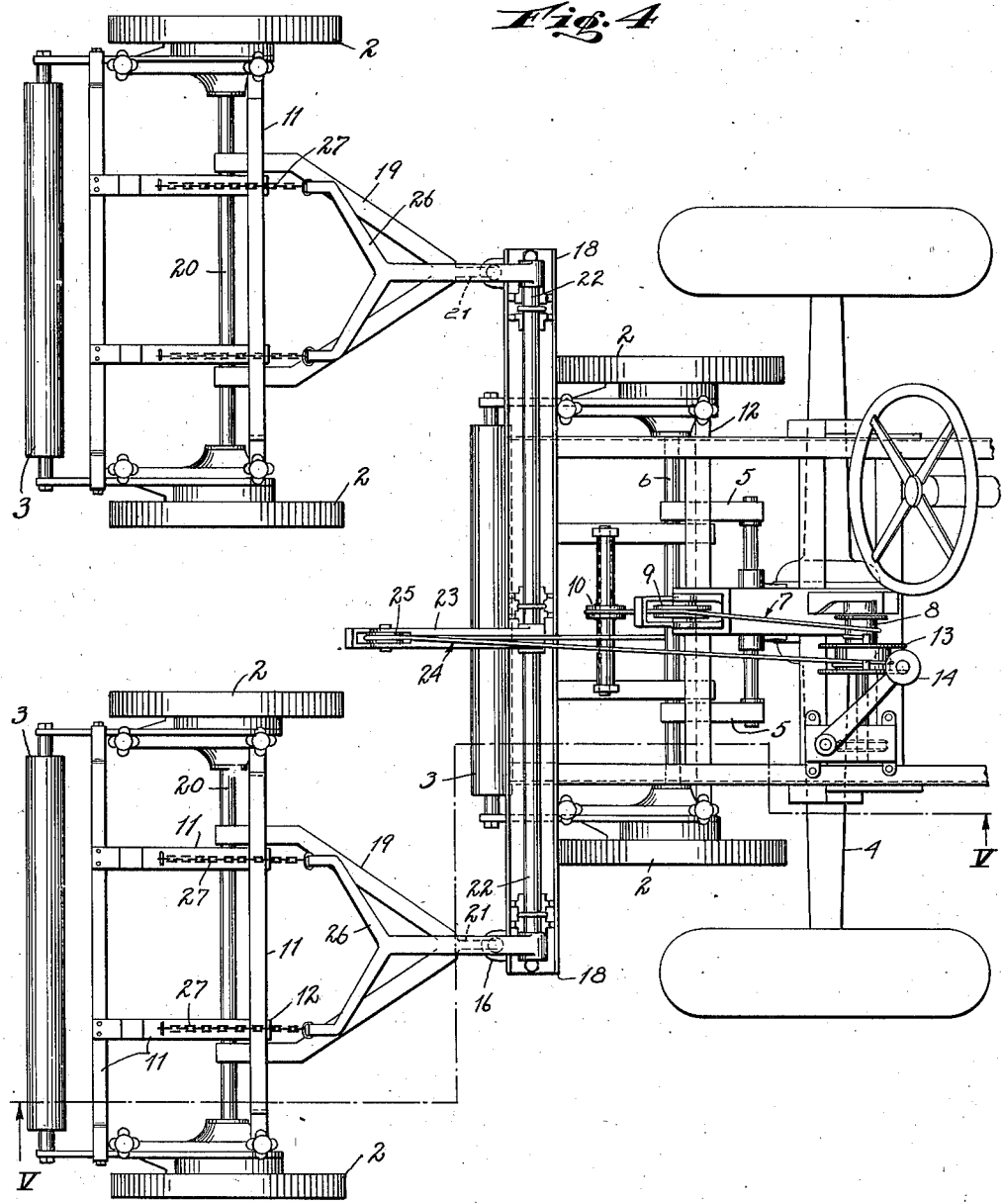

Oct. 20, 1936.  C. C. WORTHINGTON  2,058,048
GANG LAWN MOWER
Filed March 9, 1933  3 Sheets-Sheet 3
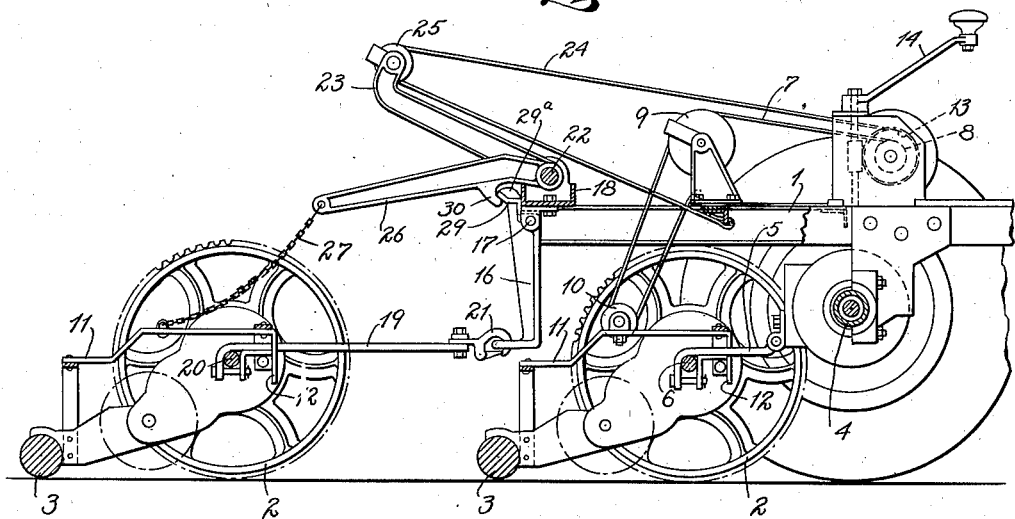
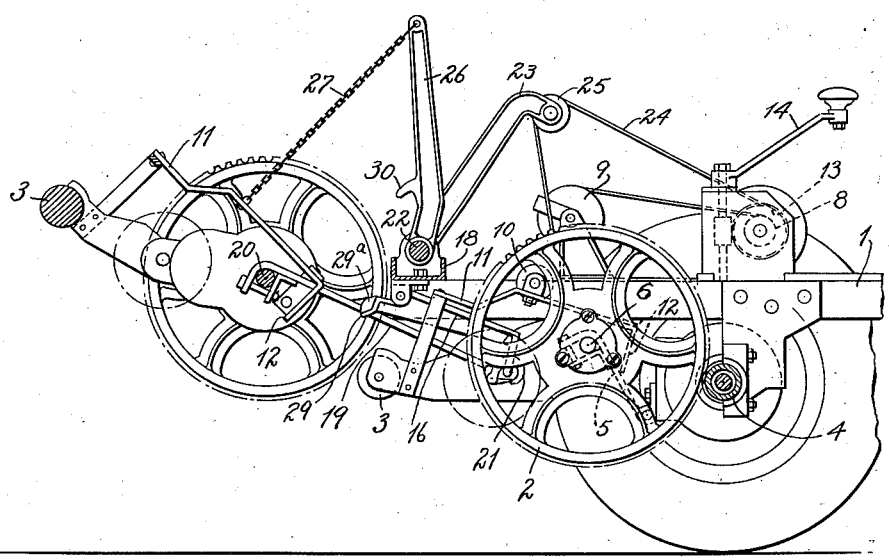

Patented Oct. 20, 1936

2,058,048

UNITED STATES PATENT OFFICE 2,058,048

GANG LAWN MOWER

Charles C. Worthington, Dunfield, N. J.

Application March 9, 1933, Serial No. 660,079

19 Claims. (Cl. 56—7)

The invention relates to the manner of organizing and connecting a gang of lawn mower units to a vehicle chassis to constitute a power gang lawn mower, the units being spaced and held in proper overlapping relation so as to mow a composite swath on curves as well as straightaways and being arranged at the same time to be lifted high above the ground, so as to allow the vehicle to surmount and pass over curbs and like obstructions as sometimes necessary when the apparatus proceeds from one field of operation to another.

Figure 1:
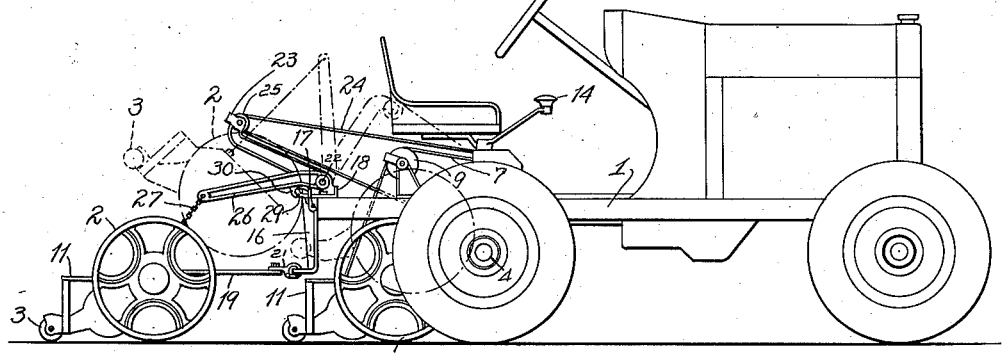

The drawings illustrate the new organization in a preferred form, Fig. 1 being a side elevation of the gang mower.

Figure 2:
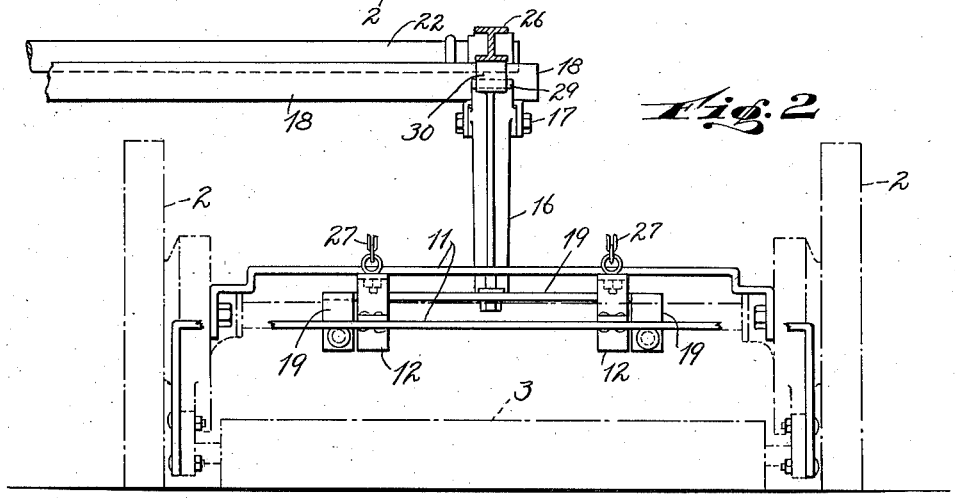
Figure 3:
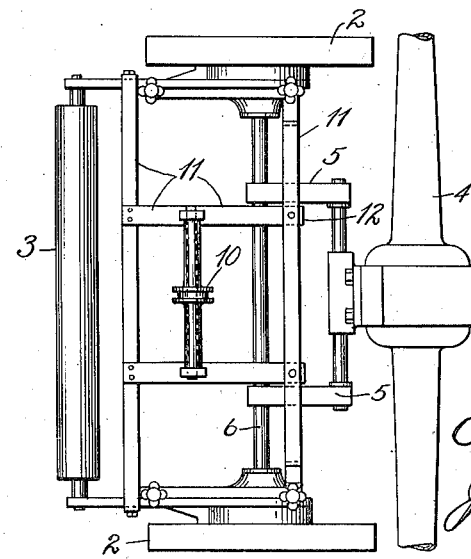

Fig. 2 is a rear view, partly in section, of a rear unit;

Fig. 3 a plan detail of the front unit;

Fig. 4 a plan view of the rear part of the mower;

Fig. 5 a longitudinal vertical section on line V—V of Fig. 4 and

Fig. 6 a similar view with the units elevated.

According to this invention the gang of units is connected under and behind the rear end of a motor vehicle chassis 1 of any suitable design, but one having light weight, as otherwise its wheels are likely to rut the soft turf of the lawn being mowed. The vehicle should also have a short wheel base and a short turning radius so that it can be easily maneuvered. Otherwise it may be constructed according to conventional design but preferably is provided with a sufficient overhang of its frame, beyond the rear axle to accommodate the connection of the lawn mower units thereto. This overhang may consist of rearward extensions of the side girders or frame members of the chassis brought together so that the frame is of less width at this point than the distance between the ground wheels of the lawn mower unit, for a reason which will presently appear.

The gang in the present case comprises three identical lawn mower units of conventional design, although more than three could be organized with the vehicle within the principle of this invention, as will presently appear. Each unit comprises a pair of ground rollers or wheels marked 2, with rotary fly knives, indicated by dotted circles, driven thereby and a rear gauge roller 3. The front unit is secured to the chassis or to the rear axle housing 4 thereof, or any other chassis part, so that the axis of its ground wheel is close to the vehicle axle. The means of connection comprise two pivoted draft links 5, which are clasped, hooked or otherwise engaged preferably to the axle 6 of the unit, but with sufficient looseness so that the unit can rock or tilt in the vertical plane of its own wheel axis independently of the vehicle wheels and thereby accommodate all kinds of ground undulations, but being nevertheless held at all times square to the direction of travel.

As thus connected the front unit is arranged to be lifted by a hoisting means carried on the chassis, to a position well above the ground, as indicated in Fig. 6, this position being high enough to escape any ordinary obstacles passed over by the vehicle. The hoist mechanism comprises a cable 7, which runs from the spool 8 of a hand winch on the chassis over a guide sheave 9 and thence around a pulley 10 on the unit, the end of the cable being appropriately fastened to the chassis. The pulley 10 is connected to the unit through a rigid bridle frame 11, fastened to the side castings of the unit and the pulley 10 is centrally mounted thereon above the cutter mechanism and above or slightly forward of the center of mass of the unit, so that when the hoist is operated, the forward part of the unit does not tend to droop or sag and lifts the draft links 5 to the upturned position indicated in Fig. 6. The unit can be hoisted, if desired, until it makes contact with the underside of the chassis frame in which position the rearwardly extending side girders will become located between the ground wheels of the unit and the tops of the latter will be above the level of the chassis frame, as indicated in Fig. 6. In addition to forming an appropriate central hoisting connection for the unit, the bridle frame 11, by the location of certain of its parts between the draft links 5, serves to retain the unit against displacement in sidewise direction relatively to the draft links. For this purpose the bridle frame has fingers 12 depending between and below the normal level of the draft links 5.

The winch above referred to comprises a worm-driven winding shaft carrying the spool 8 for the front unit and a larger spool 13 for the rear units. It is operated by a crank on a vertical axis, located at the side of the operator's seat, but it could obviously be power-operated if desired.

The units of the rear row, being two in number in the present case, are connected to the motor vehicle by linkages which give them perfect freedom of movement to accommodate ground undulations and also to turn through horizontal angles when the vehicle is rounding curves, but always holding proper tracking relation with the unit or units of the front row, so that they continuously overlap their swaths and this linkage is so arranged that both units can be lifted high above the ground, when desired, similarly to the front unit. This draft means is also so constituted that when these units are lifted, they are also shifted forwardly, closer to the rear axle of the vehicle, the purpose of such shifting being to bring their weights closer to the rear axle and thus reduce the tendency for the front wheels of the vehicle to lift off the ground. The units are heavy and their aggregate weight when suspended from the rear overhang of the chassis frame, even in a three-unit gang, is likely to take so much weight from the front vehicle wheels as to interfere with steering and of course the tendency to over-balance is aggravated when the front wheels are driven up onto curbs and the like, the vehicle wheel base being short, as stated.

While the forward shifting of the rear units can be produced in various ways, the method believed to be simplest comprises the use of a draft bracket 16 for each unit, which is hinged to the chassis overhang, as indicated at 17, so that it can swing forward from its normal position, which is vertical. In this normal position, indicated in Fig. 5, the upper part of the draft bracket bears on and is stopped by the rear face of a cross bolster 18 on the chassis frame. Each rear unit is connected to the hinged draft bracket 16 by its draft frame 19, which latter is hooked and pinned loosely over the cross rod 20 of the unit and provided with a front hook or clevis 21 for connection with the eye in the draft bracket 16. Bridle frames 11 similar to that on the front unit are provided also for the rear units and also have the fingers 12 for retaining the unit against sidewise displacement with reference to its draft frame. The point of attachment of the draft frame 19 to the hinged draft bracket 16 allows freedom to the rear unit to tilt in the plane of its own wheel axis and turn in horizontal angles and also to rise and fall relatively to the motor vehicle and the other units, as will be apparent.

The rear units are connected to the winch through the intervention of a rock shaft 22, journalled on the cross bolster 18 and having a central power arm 23 connected by cable 24 and pulley 25 to the large spool 13 of the winch. Each end of the rock shaft 22, directly above the draft bracket 16, carries fast thereon a crane arm 26 forked at its extremity and connected by chains 27, two for each unit to the bridle frame 11. The points of connection of the chains 27 to the rear unit are just forward of the center of mass of the unit, so that the unit rises properly when lifted. In such movement the weight of the unit thrusts the draft bracket 16 forwardly, as indicated in Fig. 6, allowing the unit to come to rest in its uppermost position, bearing, if desired, against the cross bolster 18 with one of its wheels. It will be seen that in this way both the front and rear ranks of units, in their elevated positions, are brought closer to the rear axle 4 of the motor vehicle, so that their joint leverage on the latter is least likely to product any objectionable upward moment on the front part of the vehicle. The front unit is shifted forwardly by virtue of the arcuate movement about their hinge axis of the draft links 5 and the rear units by virtue of the compound arcuate movements of both the draft bracket 16 and draft frame 19. The rear units are lifted higher than the front unit in order that they will not be too close to the ground when the front vehicle wheels are mounting an incline. It will now be noted that the winch spools 8 and 13 are of different diameters in order to give each rank of units the appropriate elevation by the operation of the single hand crank. They and their cables are so designed as to draw the units tightly up against the under portions of the frame and thus keep them from swaying when the vehicle is moving over rough ground. The front unit may thus bear on the underside of the bolster 18 and the rear units against the back face of it.

The hinged draft brackets 16 can be locked in their vertical or draft positions, if desired, so as to keep the rear units properly spaced from the front unit, as for instance when the machine is operating down grade, and this can be accomplished automatically, if desired, as by forming an interlock or other appropriate connection between such brackets and the rock shaft 22 or the crane arms 26 thereon. For example, the bracket may be provided with a locking lug 29, which is overlapped by a keeper 30 formed on the crane arm when the latter is in its lowered position and the chains 27 are slack, the mowing condition. The draft bracket cannot then move either forward or back but when the crane arm is lifted it becomes free to swing forwardly as already explained. In the process of lowering the unit and in the event the draft bracket should not attain its vertical position until after the crane arm has reached is lowest position, the top side of the lug 29 is curved, as indicated, at 29ᵃ (Fig. 6) in order that it may cam itself into its interlocking relation as soon as the vehicle starts.

The following is claimed:

1. In a gang lawn mower, a motor vehicle, a gang of lawn mower units in front and rear ranks, means for connecting the rear rank to the vehicle behind the rear wheel axis thereof, said means including a draft frame for a rear unit having a forwardly-shiftable point of draft attachment, and unit-hoisting means on the vehicle adapted to shift it.

2. In a power gang lawn mower, the combination with a motor vehicle and two ranks of lawn mower units connected therewith to operate behind the rear wheel axis thereof, the rear rank being forwardly shiftable from the normal working position thereof, unit-hoisting means on the vehicle connectible with all of the units and having a lift range suited to support them off the ground, and a lock for the draft connection means of the rear rank.

3. In a power gang lawn mower, the combination of a motor vehicle, front and rear ranks of lawn mower units connected to operate in rear of the vehicle by draft members, the units being pivotally related to said draft members, bridle frames for said units and hoisting mechanism having connections to said units forward of their centers of mass.

4. In a lawn mower, a motor vehicle, means for connecting a lawn mower unit thereto comprising a draft frame for the unit, a forwardly-shiftable draft member mounted on the vehicle, a pivotal connection between said frame and member, and a unit-hoist on the vehicle adapted to lift the unit off the ground.

5. In a gang lawn mower, a motor vehicle, a front rank lawn mower unit connected thereto to operate close to its rear wheels and a second rank lawn mower unit connected to operate at a predetermined mowing distance behind said front rank unit, said second rank unit being connected to swing in horizontal angles, in combination with a hoist means on the vehicle having connections to said units for lifting them out of contact with the ground and closing up the distance between said ranks.

6. In a gang lawn mower, the combination of a motor vehicle chassis provided with hoist means for the lawn mower units, of a front rank lawn mower unit connected thereto to operate close to the rear axle thereof and a second rank lawn mower unit having draft connections with said chassis adapting it to swing in horizontal angles on curves, and hoist means for closing up the distance between the front and rear units when the weight of the units is borne by said hoist means.

7. In a gang lawn mower, in combination, a motor vehicle, a front rank lawn mower unit having draft means whereby it is connected to operate close to the rear vehicle wheels, a second rank lawn mower unit having draft means whereby it is connected to swing in horizontal angles, and said last mentioned draft means being forwardly shiftable on the vehicle, and means on the vehicle for forwardly shifting said last mentioned draft means.

8. In a gang lawn motor, a motor vehicle, a front rank lawn mower unit having draft means by which it is connected thereto to operate close to the rear vehicle wheels, a second rank lawn mower unit having draft means by which it is connected to operate at a predetermined mowing distance behind said front rank unit, said draft means including a draft frame horizontally jointed to said unit and connected by a universally flexible joint to the vehicle, said universally flexible joint being forwardly shiftable on the vehicle, and means on the vehicle for forwardly shifting said joint.

9. In a gang lawn mower, a motor vehicle, a gang of lawn mower units in front and rear ranks, means for connecting the rear unit or units to the vehicle, said means comprising a forwardly-shiftable draft frame for a rear unit and a forwardly-shiftable draft member to which said frame is connected movably mounted on the vehicle, and a unit-hoist on the vehicle provided with connections for lifting and forwardly shifting said rear unit.

10. In a power lawn mower, a motor vehicle, a forwardly-shiftable lawn mower unit connected thereto to operate in rear of the rear vehicle wheel axis, in combination with unit-hoisting means on the vehicle, and hoist connections between said means and unit organized to pull the unit forwardly and lift it from the ground.

11. In a power lawn mower, a motor vehicle, a draft bracket hinged thereto and adapted to swing forwardly from its normal draft position, a lawn mower unit flexibly connected to said bracket, and means for conjointly lifting said unit and forwardly swinging said bracket.

12. In a gang lawn mower, a motor vehicle, a forwardly-shiftable draft member thereon, a lawn mower unit connected to said draft member, and lock means for said member operating to prevent forward shifting thereof.

13. In apparatus as described, the combination with a motor vehicle chassis having front and rear road wheels and an engine carried on the forepart of said chassis, of a front rank lawn mower unit including cutter-driving ground wheels and having draft means whereby it is flexibly connected to said chassis to operate between the rear wheels thereof, a rear rank lawn mower unit including cutter-driving ground wheels having draft means separately connecting it to said chassis to swing in horizontal angles behind said first mentioned unit, hoist means on the vehicle, a hoisting connection running therefrom to lift the first mentioned unit and another hoisting connection running therefrom to lift said other unit, said hoisting connections running direct to said units independently of the draft means of said units and both adapted to hold said driving ground wheels out of contact with the ground.

14. In apparatus of the kind described, the combination of a motor vehicle chassis having its engine mounted on its forward part and having a hoist means thereon, a front rank lawn mower unit connected to the rear part of said chassis to operate close to the rear vehicle wheels, a rear rank lawn mower unit connected to swing in horizontal angles behind said first mentioned unit, a short range hoisting connection running from said hoist means to said first rank unit adapted to lift its ground wheels off the ground, and a longer range hoisting connection running from said hoist means to said other unit adapted to lift its ground wheels a greater distance off the ground.

15. The combination of a motor vehicle chassis carrying a hoist means and having its frame structure extended in rear of its point of support on the rear axle, a front rank lawn mower unit including cutter-driving ground wheels connected to the chassis to operate close to the rear axle, a rear rank lawn mower unit including cutter-driving ground wheels connected to the chassis to swing in horizontal angles in rear of said front unit, a hoisting connection running from said hoist means to said front unit adapted to lift its ground wheels out of contact with the ground, and a hoisting connection supported on said rearwardly extended frame structure running to the other unit and adapted to lift the ground wheels of the latter unit to a greater extent out of contact with the ground.

16. The combination of a motor vehicle chassis carrying a hoist means and having its frame structure extended in rear of its rear axle, a front rank lawn mower unit including cutter-driving ground wheels and provided with draft means whereby it is connected to the chassis to operate between said rear wheels, a rear rank lawn mower unit provided with cutter-driving ground wheels and with draft means whereby it is connected to trail said front unit, a hoisting connection running from said hoist means to said front unit adapted to lift its ground wheels out of contact with the ground, and a hoisting connection supported on said rearwardly extended structure, running to the other unit and adapted to lift its ground wheels out of contact with the ground, said draft means for each unit comprising two pivotal joints each permitting vertical movement of its unit and said hoisting connections being attached to said units independently of said draft means and joints.

17. The combination of a motor vehicle chassis carrying a hoist means and having its frame structure extended in rear of its rear axle, a front rank lawn mower unit including cutter-driving ground wheels and connected to the chassis to operate between said rear wheels, a rear rank lawn mower unit including cutter-driving ground wheels and connected to swing in horizontal angles behind said front unit, a hoisting connection running from said hoist means to said front unit adapted to lift the same out of contact with the ground, and a hoisting connection including a crane arm journalled on said rearwardly extended frame structure and connected to said trailing unit and adapted to lift the ground wheels of said unit out of contact with the ground.

18. The combination of a motor vehicle carrying a hoist means and having its side girders extended in rear of its rear wheels, a front rank lawn mower unit including cutter-driving ground wheels and connected to the vehicle to operate close to said rear wheels and below said rearwardly extended girders, a rear rank lawn mower unit including cutter-driving ground wheels and connected to the chassis in rear of said front unit, a hoisting connection running from said hoist means to said front unit adapted to lift its ground wheels from the ground and toward said girders so that the tops of said ground wheels are above the level thereof, and a hoisting connection running to the other unit supported on said rearwardly extended girders and adapted to lift the latter unit to a higher elevation than the front unit.

19. The combination of a motor vehicle chassis and a lawn mower unit including cutter-driving ground wheels, said chassis comprising side frame members extended rearward of the rear vehicle wheels and separated from each other by a space less than the space between the ground wheels of the unit, and said unit being connected to the vehicle to operate below the level of said rearwardly extended frame members, a hoist means on the chassis, and a hoisting connection running therefrom to said unit adapted to elevate said unit to a position in which said frame members are between its ground wheels.

CHARLES C. WORTHINGTON.